US009747291B1

(12) United States Patent
Mall et al.

(10) Patent No.: US 9,747,291 B1
(45) Date of Patent: Aug. 29, 2017

(54) NON-DISRUPTIVE UPGRADE CONFIGURATION TRANSLATOR

(71) Applicant: EMC Corporation, Hopkinton, MA (US)

(72) Inventors: Shikhar Mall, Seattle, WA (US); David Leimbach, Lynnwood, WA (US); Gerald Carter, Dadeville, AL (US)

(73) Assignee: EMC IP Holding Company LLC, Hopkinton, MA (US)

( * ) Notice: Subject to any disclaimer, the term of this patent is extended or adjusted under 35 U.S.C. 154(b) by 59 days.

(21) Appl. No.: 14/982,063

(22) Filed: Dec. 29, 2015

(51) Int. Cl.
*G06F 9/44* (2006.01)
*G06F 12/00* (2006.01)
*G06F 17/30* (2006.01)
*G06F 9/445* (2006.01)

(52) U.S. Cl.
CPC ......... *G06F 17/30082* (2013.01); *G06F 8/65* (2013.01); *G06F 17/30094* (2013.01); *G06F 17/30194* (2013.01)

(58) Field of Classification Search
CPC .... G06F 8/65; G06F 9/4406; G06F 17/30082; G06F 17/30094; G06F 17/30194
USPC .......................... 717/168–173; 707/822, 827
See application file for complete search history.

(56) References Cited

U.S. PATENT DOCUMENTS

| | | | | |
|---|---|---|---|---|
| 2002/0128995 | A1* | 9/2002 | Muntz | G06F 17/30067 |
| 2003/0131104 | A1* | 7/2003 | Karamanolis | G06F 17/30067 709/225 |
| 2003/0233648 | A1* | 12/2003 | Earl | G06F 8/65 717/176 |
| 2005/0257211 | A1* | 11/2005 | Chatterjee | G06F 8/67 717/170 |

(Continued)

*Primary Examiner* — Qing Chen
(74) *Attorney, Agent, or Firm* — Krishnendu Gupta

(57) ABSTRACT

Implementations are provided herein for non-disruptive upgrade including rollback capabilities for a distributed file system within a cluster of nodes. To continue availability of the file system to external clients during the upgrade process, nodes can be upgraded piecemeal, for example, in one implementation, one node at a time. When a node is undergoing certain stages of the upgrade process, external clients can be directed toward the remaining nodes of the file system that are not currently being upgraded, including already upgraded nodes, to perform client activity. During the upgrade process, a first subset of nodes can be running in an upgraded state while a second subset of nodes can be in a non-upgraded state, both providing access to external clients in a seamless manner. In one implementation, a second namespace can be established at the onset of the upgrade process that reflects the new version of the operating system. The second namespace can be maintained in parallel with the original namespace during the pendency of the upgrade and/or downgrade process. A configuration translation layer can also be established on each node of the cluster of nodes. The configuration translation layer can provide the necessary key value pair translations that allow (Continued)

a request made an old version node to be performed by a new version node and vice versa. At the conclusion of an upgrade or a rollback, the cluster can enter a committed state and the namespace data that is no longer needed can be expired.

15 Claims, 10 Drawing Sheets

(56) References Cited

U.S. PATENT DOCUMENTS

| | | | |
|---|---|---|---|
| 2008/0263535 A1* | 10/2008 | Dias | G06F 8/67 717/168 |
| 2009/0006468 A1* | 1/2009 | Shankar | G06F 17/30194 |
| 2012/0110150 A1* | 5/2012 | Kosuru | H04L 41/082 709/221 |

* cited by examiner

NON-DISRUPTIVE UPGRADE CONFIGURATION TRANSLATOR

CROSS REFERENCE TO RELATED APPLICATIONS

This application is related to co-pending U.S. patent application Ser. No. 14/982,012 for NON-DISRUPTIVE UPGRADE INCLUDING ROLLBACK CAPABILITIES FOR A DISTRIBUTED FILE SYSTEM OPERATING WITHIN A CLUSTER OF NODES and filed concurrently herewith, which is incorporated herein by reference for all purposes; to co-pending U.S. patent application Ser. No. 14/982,020 for NON-DISRUPTIVE UPGRADE MIGRATION HEURISTICS AND HEALTH CHECK and filed concurrently herewith, which is incorporated herein by reference for all purposes.

FIELD OF THE INVENTION

This invention relates generally to distributed file systems, and more particularly to implementations for a non-disruptive upgrade configuration translator for nodes operating under different versions of a distributed file system among a cluster of nodes.

BACKGROUND OF THE INVENTION

Distributed file systems offer many compelling advantages in establishing high performance computing environments. One example is the ability to easily expand, even at large scale. Another example is the ability to support multiple unique network protocols. In one example, a distributed file system can operate under a cluster of nodes topology, whereby clients can connect to any node among the cluster of nodes to perform file system activity. Individual nodes among the cluster of nodes each can contain their own processor(s), storage drives, memory and the like. Operating together in a cluster, the nodes can respond to client requests, store data, mirror data, and accomplish all the tasks of a modern file system. A cluster of nodes, in some cases, can provide easy scalability by providing for new nodes to be added to the cluster of nodes to increase the amount of storage space within the distributed file system and/or to meet other needs of the users of the distributed file system.

One demand that users of a distributed file system likely have is to avoid any single point of failure to user critical work flows. For example, if a storage device within one of the nodes fails, users expect the data to be useable from a secondary source, with as little disruption as possible. This is one reason why data is mirrored across more than one storage device and more than one node. If a drive or a node fails, a client can still find the data they seek within a different drive and/or connect to a different node. With businesses depending on the reliability of their data storage systems in order to serve their customers, many businesses expect a distributed file system to continue to operate every hour of every day throughout the year. However, when an administrator of a distributed file system operating within a cluster of nodes wishes to upgrade the file system to a new version, the process can cause disruptions to users of the file system. For example, if every node of the file system needed to be upgraded simultaneously, clients would be unable to connect to a node and access data stored within the file system during the upgrade process. By upgrading one node or a small subset of nodes at any one time, the remaining nodes not currently undergoing an upgrade can still service client requests. However, if nodes are upgraded piecemeal, nodes running two different versions of the operating software may be incompatible. Therefore, there exists a need for nodes running two different versions of the operating system during a rolling upgrade to remain compatible at least until the entirety of the nodes of the cluster are using the same version of the operating software.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a request can be received to begin a non-disruptive upgrade of a distributed file system operating within a cluster of nodes, wherein the distributed file system supports a set of protocol services. A current version namespace can be identified wherein the current version namespace is associated with a set of current version key value pairs for each protocol service in the set of protocol services. A new version namespace can be created wherein the new version namespace is associated with a set of new version key value pairs for each protocol service in the set of protocol services. A configuration translation layer can be established on each node in the cluster of nodes wherein the configuration translation layer is operable to at least one of: convert a key from the set of current version key value pairs for each protocol service in the set of protocol services to a pair from the new version key value pairs for each protocol service in the set of protocol services; and convert a key from the set of new version key value pairs for each protocol service in the set of protocol services to a pair from the old version key value pairs for each protocol service in the set of protocol services. In response to receiving a client request by a node within the cluster of nodes, the client request can be processed by the node, wherein processing the request includes maintaining both the current version namespace and the new version namespace, wherein the configuration translation layer is used to process the client request in at least one of the current version namespace and the new version namespace based on a version associated with the node.

In accordance with another aspect, in response to the cluster of nodes moving from an upgraded state to a committed state, the configuration translation layer can be deactivated from each node of the cluster of nodes and the current version namespace and the set of current version key value pairs can be expired.

In accordance with another aspect, in response to the cluster of nodes from a downgrading state to a committed state, the configuration translation layer can be deactivated from each node of the cluster of nodes and the new version namespace and the set of new version key value pairs can be expired.

The following description and the drawings set forth certain illustrative aspects of the specification. These aspects are indicative, however, of but a few of the various ways in which the principles of the specification may be employed. Other advantages and novel features of the specification will

DETAILED DESCRIPTION

Figure 1:
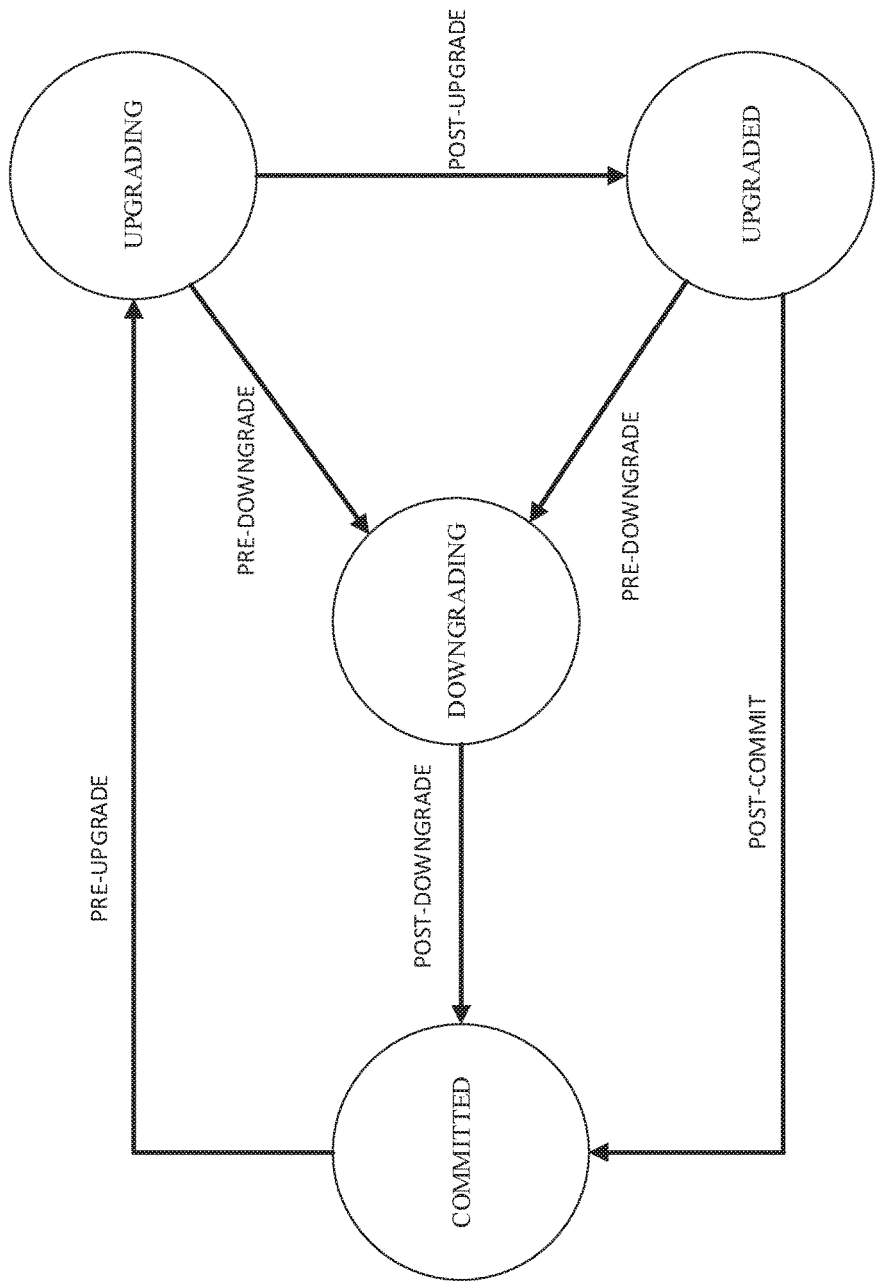
FIG. 1 illustrates an example state diagram for a non-disruptive upgrade process with rollback functionality in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode," as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein. Also, in at least one of the various embodiments, the inode data may be referred to as stat data, in reference to the stat system call that provides the data to processes.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "protocol head" refers to a gateway local to an individual node that manages communications with external clients and sometime internal clients using a specific network protocol. For example, a Network File System ("NFS") external client that makes a file system request to the distributed file system would communicate with the NFS protocol head in making the request. The protocol head can schedule work items, translate file system requests from the native protocol language to operating system commands of the native file system in order to process the request, and communicate with the external clients using protocol specific cadence that the protocol client expects. Examples of the types of protocol heads that can exist within a distributed file system include NFS, Server Message Block ("SMB"), Hadoop Distributed File System ("HDFS"), hypertext transfer protocol ("HTTP"), file transfer protocol ("FTP"), simple object access protocol ("SOAP"), and protocols specific to the Open Stack project such as Open Stack Swift, Open Stack Manila, etc. In addition to network protocols, the job engine as defined below can act similar to a protocol head in scheduling and performing internal file system jobs.

The term "job engine" refers to a component within the distributed file system that manages automated processes such as file system maintenance, file system data services, and non-client initiated work items. The job engine can queue work items similar to how a protocol head queues work items received by protocol clients.

The term "supervisor" refers to a short lived process that is run to assess the current state of the cluster and take appropriate action. The supervisor is stateless and can collect the state from any agent by passing messages to and from the agent running on the same node as the supervisor or a different node than the supervisor. The supervisor can then decide what actions, if any, to take, at any given point during the upgrade, rollback, or commit process.

The term "agent" refers to a node centric application that runs on each node in the cluster of nodes. It can be used to take actions on the local node based on received messages. For example, it can take actions based on instructions received from a supervisor. An agent can maintain a local persistent storage area (e.g., in stable storage, flash storage, cache memory, etc.) to indicate what has been accomplished on that particular node.

The term "hook" refers to a predetermined set of applications and/or files to run at specific points during the non-disruptive upgrade, downgrade, or commit process. At different times throughout the upgrade process, there may be point of interest for varying applications. A hook allows for applications to be injected into the upgrade to support application specific needs. In one implementation, scripts, tasks, processes, etc. can be added as executables that are ran when the hook is processed. In one implementation, hooks can trigger notifications that the upgrade process has reached the stage associated with the hook to other processes that subscribed to such events. A hook can have a predefined directory assigned to it, where when run, the hook will execute each file in the directory marked as an executable. Executables within the hook directory can be executed at the same time in parallel. In one implementation, the executable are ran in an undefined order. The hook can wait until it confirms each executable in the hook has completely successfully before completing itself. In one implementation, if an executable does not complete in a timely fashion (where timeliness can be configured by an administrator, have set default values, or can be tailored to the type of applications) an alarm can be raised to either the agent and/or the supervisor. Hooks can occur in at least two classes. A cluster class hook will attempt to execute the set of executables on all nodes of the cluster of nodes simultaneously in parallel. Cluster class hooks can support executables in the hook running later (e.g., not in parallel) on a "missed" node for error correction purposes. A node class hook is executed on one node at a time, with other actions, including, potentially, other hooks or other unrelated processes.

The term "tracking state" refers to the current state of the node as it how it relates to the non-disruptive upgrade process. The upgrade, downgrade, and commit processes as described in implementations of this disclosure can mark the node with a tracking state that can describe to other processes the current state of the node. Tracking states can include: "upgrade ready" which marks the node as ready to be upgraded; "upgrading" which marks the node as upgrading; "upgraded" which marks the node as having completed upgrading; "commit" which marks the nod as committed; "done" which marks the node as having finished all the steps of the upgrade (or in some implementations, downgrade) process; rollback which marks the node to be rolledback; and rolledback which marks the node as having been rolled back. The tracking state of a node can be accessed by the supervisor to gauge progress of the upgrade process or by other services not associated with the upgrade process.

Implementations are provided herein for non-disruptive upgrade including rollback capabilities for a distributed file system within a cluster of nodes. To continue availability of the file system to external clients during the upgrade process, nodes can be upgraded piecemeal, for example, in one implementation, one node at a time. When a node is undergoing certain stages of the upgrade process, external clients can be directed toward the remaining nodes of the file system that are not currently being upgraded, including already upgraded nodes, to perform client activity. During the upgrade process, a first subset of nodes can be running in an upgraded state while a second subset of nodes can be in a non-upgraded state, both providing access to external clients in a seamless manner.

In one implementation, a second namespace can be established at the onset of the upgrade process that reflects the new version of the operating system. The second namespace can be maintained in parallel with the original namespace during the pendency of the upgrade and/or downgrade process. A configuration translation layer can also be established on each node of the cluster of nodes. The configuration translation layer can provide the necessary key value pair translations that allow a request made within an old version node to be performed within a new version namespace maintained in parallel with an old version namespace on the old version node and a request made on a new version node to be performed within an old version namespace maintained in a parallel to a new version namespace running on the new version node. At the conclusion of an upgrade or a rollback, the cluster can enter a committed state and the namespace data that is no longer needed as well as configuration translator can be expired.

It can be appreciated that external clients to the protocol heads communicate in protocol specific language in making file system requests. For example, when an NFS client makes a read request for a file, the read request is made using NFS protocol specific terminology that is interpreted by the NFS protocol head. The NFS protocol head can then translate the NFS request into base file system language that is used to actually process the request within the file system. The same process is followed when an SMB or an HDFS client connects to their respective protocol heads and make work requests. One way to translate requests from the native protocol language to the base operating system language is through key value pairs. The protocol language request can be used as a key to unlock the pair in a table or similar construct that is the base file system language needed to effectuate the work item. It can be appreciated that a node will have the necessary key value pairs to translate protocol requests for the version of the namespace that is the same as the version of the node. However, as stated above, each node can maintain a second namespace associated with the non-local version of the node (e.g. the original version namespace for an upgraded node or the upgraded namespace for an original version node). The configuration translation layer can provide for key value pair translations necessary for an old version node to process old version requests and/or new version requests into both the old version namespace it has always been maintaining and the new version namespace it is now maintaining in parallel at the start of the upgrade process. The configuration translation layer can also provide for key value pair translations necessary for a new version node to process old version requests and/or new version requests into both the new version namespace it inherently maintains and the old version namespace it continues to maintain after entering an upgraded state.

Referring now to FIG. 1, there is illustrated an example state diagram for a non-disruptive upgrade process with rollback functionality in accordance with implementations of this disclosure. The state diagram begins in the committed state, where you are operating a stable version of the distributed file system that can no longer be downgraded to a previous state. When in a committed state, all the services associated with the version of the committed state of distributed file system can be active. For example, disk structures can reflect the current version of the distributed file system. Configuration information can reflect the current version of the operating system. The arrows denote the potential flows of the states during an upgrade or downgrade process. The pre-upgrade, pre-downgrade, post-upgrade, post downgrade, and post-commit labels denote cluster class hooks that are a part of the upgrade process. It can be appreciated that once in a committed state, downgrades are no longer available.

Prior to upgrading to a new version of the operating system of the distributed file system, a pre-upgrade process can occur. The pre upgrade process can occur through a set of pre upgrade hooks that are a cluster class hook. The hook can run a set of custom executables associated with the stage of the upgrade. For example, for pre-upgrade, executables in the hook can include an application that determines if the minimum amount of disk space is available across the cluster of nodes to support the upgrade process. In another example, the protection level of the cluster can be analyzed to determine whether an upgrade would risk data loss. In another example, all the drives in all the nodes can run a health check to determine the health of the drive. It can be appreciated that any number of diagnostics can be run that can assess the ability of the cluster to upgrade and/or prepare the cluster for an impending upgrade. It can be appreciated that some of these node level health checks, including disk health can be performed again at the node level in a hook associated with the node upgrade process as more fully described below. In one implementation, a pre-upgrade hook can include the creation of a new version namespace on each node within the cluster of nodes. In one implementation, a pre-upgrade hook can include establishing a configuration translation layer on each node among the cluster of nodes.

During the upgrading state, nodes can proceed with the upgrading process, specifically as described in more detail in the co-pending applications incorporated by reference above. The upgrading process can occur one node at a time or in some implementations several nodes at a time in parallel. It can be appreciated that during at least some parts of the process when a node is an upgrading state, the node is inaccessible to clients. When the node has completed the upgrading state (e.g., installing new software and all cluster enabled services are registered as healthy), the node enters an upgraded state. It can be appreciated that during the upgrading state, some nodes may be in an upgraded state while other nodes may yet to be upgraded. It can also be appreciated that prior to being upgraded, nodes may still be participants in the upgrade process through the execution of pre-upgrade hooks that can occur cluster wide. In implementations provided herein, a configuration translation layer can be used to provide interoperability between upgraded nodes and nodes that have yet to be upgraded. Implementations are also provided herein for the configuration translation layer to provide interoperability between upgraded nodes and nodes that have been downgraded.

Figure 2:
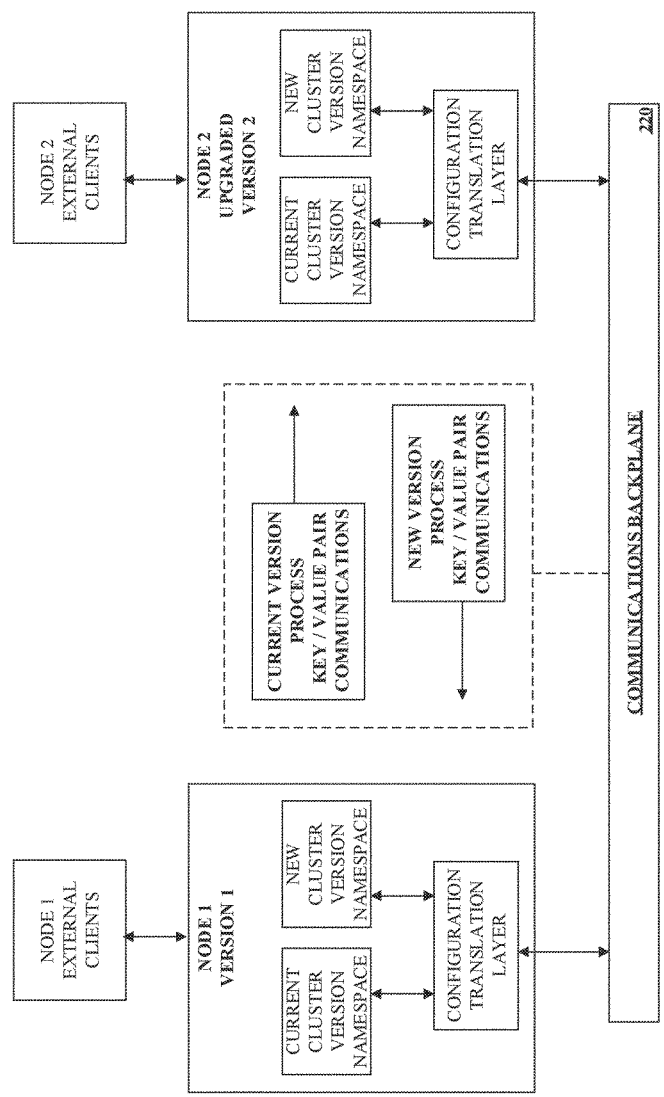
FIG. 2 illustrates an example of two differing versioned nodes among a cluster of nodes that is currently undergoing a non-disruptive upgrade in accordance with implementations of this disclosure.

Referring now to FIG. 2, there is illustrated an example of two differing versioned nodes among a cluster of nodes that is currently undergoing a non-disruptive upgrade in accordance with implementations of this disclosure. Nodes can be interconnected by a communications backplane 220 that is more fully described below with respect to FIG. 9. The communications backplane 220 can be a high bandwidth low-latency backplane that provides for internode communications.

Node 1 is running version 1 of the distributed file system and Node 2 is an upgraded state running version 2 of the distributed file system. As Node 1 external clients, Node 2 external clients, and internal file system clients (e.g., the job engines, data services, etc.) continue to use the distributed file system, communication will likely be required between nodes running different versions. For consistency, both nodes can maintain a current cluster version namespace (e.g., Version 1) and new cluster version namespace (e.g., Version 2). During the upgrade process, the version of the namespace used to process a request is determined by the operating system version of the process that is issuing the request. For example, if a process originating from Node 1, must be processed, in part, by Node 2 (e.g., a read request from an external client of Node 1 for data stored within Node 2 but not Node 1) the current cluster version namespace being maintained by the upgraded Node 2 can be used to process the request. In one implementation only upgraded nodes can handle the translation for managing the newer version namespace. In one implementation the newer version namespace can be maintained on previous version nodes; however, the previous version node can request the upgraded node to translate requests made by the older version node.

The configuration translation layer used to maintain two versions of the namespace on a single node can be based on a set of key value pairs. Each configuration namespace can be represented by a string and serve as containers for the key value pairs that are addressed by that string. Different sets of configuration namespaces can be made available to a node depending on the operating system version the node is running. In one implementation, keys can be UTF-8 byte sequences. In one implementation, values can be binary blobs.

In one implementation, a key value pair interface can be established wherein the key value pair interface provides for a user of the distributed file system to at least one of create key value pairs, update key value pairs, remove key value pairs, and restore a namespace. In one implementation, namespaces can be dynamically created and destroyed at the start, during, and at the conclusion of the upgrade/roll back process. For example, separate configuration namespaces can be established for each protocol head to effectuate how the individual protocol heads make translations between differing versions of the distributed file system operating system. For example, new versions of the operating system may provide for new protocol features for NFS but not for SMB. Thus, if the SMB protocol remained unchanged between versions, the key value pairs representing the translation could be an identity function (e.g., returns the same input as the output). While the NFS protocol head incorporates new features in the new version, with new schema to support NFS operations, to maintain the new namespace, the new NFS configuration namespace would be used.

In one implementation, a set of current version key value pairs associated with translating current version requests of services into a new version namespace can be maintained. In one implementation, a set of new version key value pairs associated with translating new version requests of services into an old version namespace can be maintained. In one implementation, the set of current version key value pairs and the set of new version key value pairs include at least one of create keys, update keys, get keys, and remove keys. It can be appreciated that the sets of current version key value pairs and new version key value pairs can include subsets related to specific protocol heads (e.g., configuration namespaces).

It can be appreciated that providing configuration namespaces to development teams to effectuate changes to their namespaces, service writers (e.g., developers working on features specific to a protocol head) can organize the way changes between versions take place without worrying about how those changes affect other services. It can also be appreciated that this framework can allow for doing quality assurance testing for translations up front, accelerating the porting process between a first version and a second version of the operating system.

In one implementation, new features in the upgraded version may be delayed from going live until the cluster reaches a committed state. However, it can be appreciated that by maintaining the new cluster version namespace during the rolling upgrade process, the new software features can be established with a base timeline from when the upgrade process started (e.g., when the new cluster version namespace was created and maintained in parallel going forward).

Figure 3:
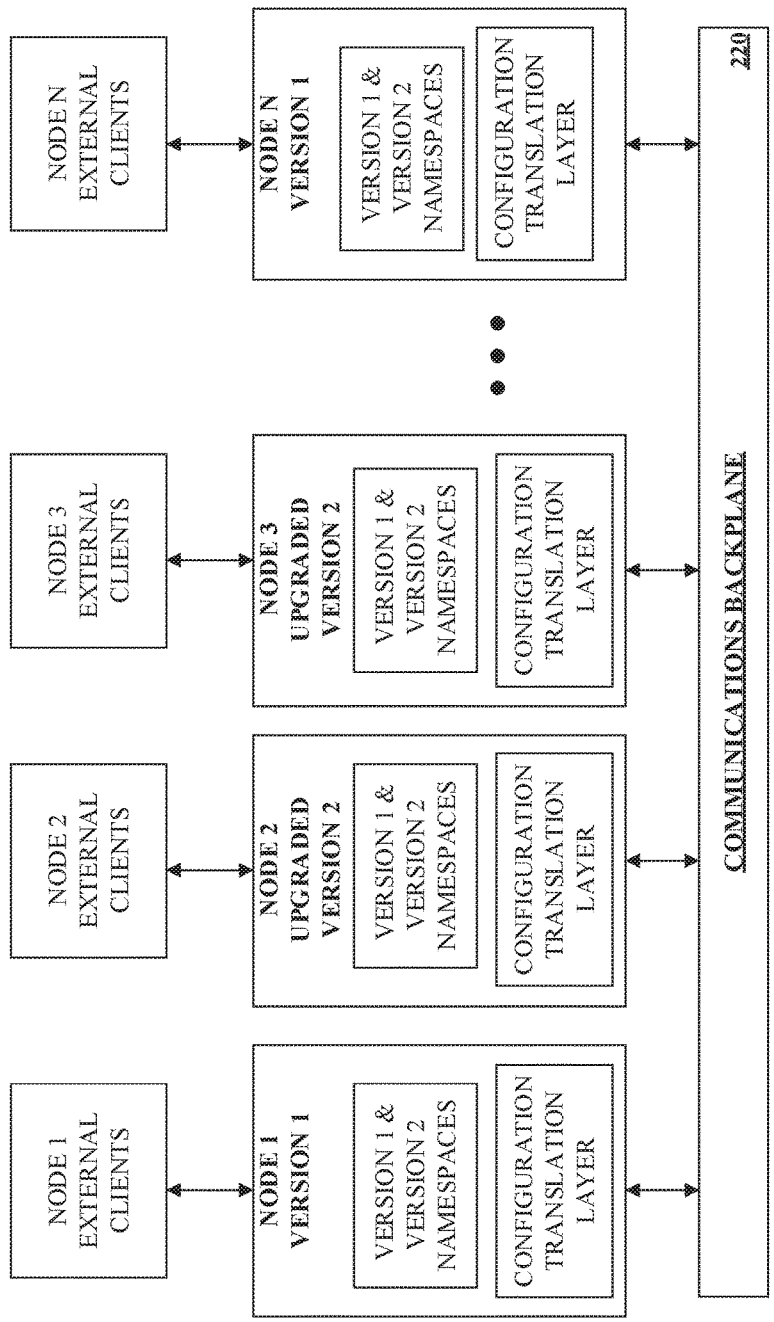
FIG. 3 illustrates an example cluster of nodes with two upgraded nodes in accordance with implementations of this disclosure.

Referring now to FIG. 3, there is illustrated an example cluster of nodes with two upgraded nodes in accordance with implementations of this disclosure. FIG. 3 denotes Node 1, Node 2, Node 3 and Node N (Where "N" is an integer greater than 3). Together, the nodes depicted form a cluster of nodes that operate together to form a distributed file system. In one implementation, the distributed file system is operable due to each node running a common operating system that facilitates communications between nodes for data processing, data mirroring, data protection, and all relevant data services in a modern file system. In one implementation, the operating system is the OneFS operating system that is developed and sold by EMC Corporation.

In FIG. 3, Nodes 2 and 3 are running in an upgraded state while Node 1 and Node N are running the pre-upgraded version of the operating system. It can be appreciated that no matter the upgrade state of the node, all nodes are maintaining two namespaces, one associated with version 1 and one associated with version 2. Until all nodes reach a committed state, both versions of the namespace are maintained to preserve both possible options after starting the non-disruptive upgrade: rolling back or upgrading.

Figure 4:
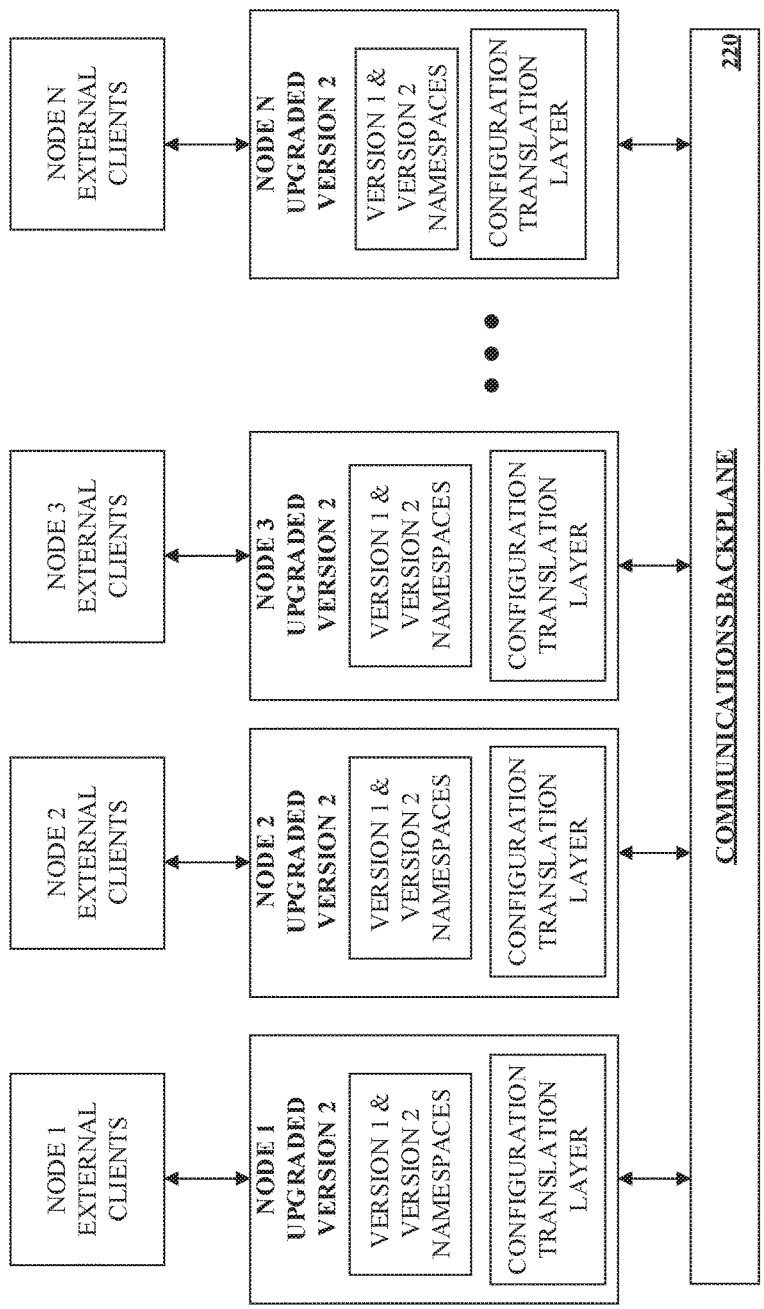
FIG. 4 illustrates an example cluster of nodes with each node in an upgraded state in accordance with implementations of this disclosure.

Referring now to FIG. 4, there is illustrated example cluster of nodes with each node in an upgraded state in accordance with implementations of this disclosure. In this example, all nodes in the cluster of nodes have reached an upgraded state; however, an administrator has yet to commit to the upgrade. For example, the administrator may desire to run the cluster of nodes in the upgraded state until they are convinced remaining in the upgraded state permanently is desirable. Prior to committing to the upgrade, the previous version namespace is maintained allow for a rolling downgrade of all the nodes and eventually commitment back to the pre-upgrade state of the cluster of nodes.

Figure 5:
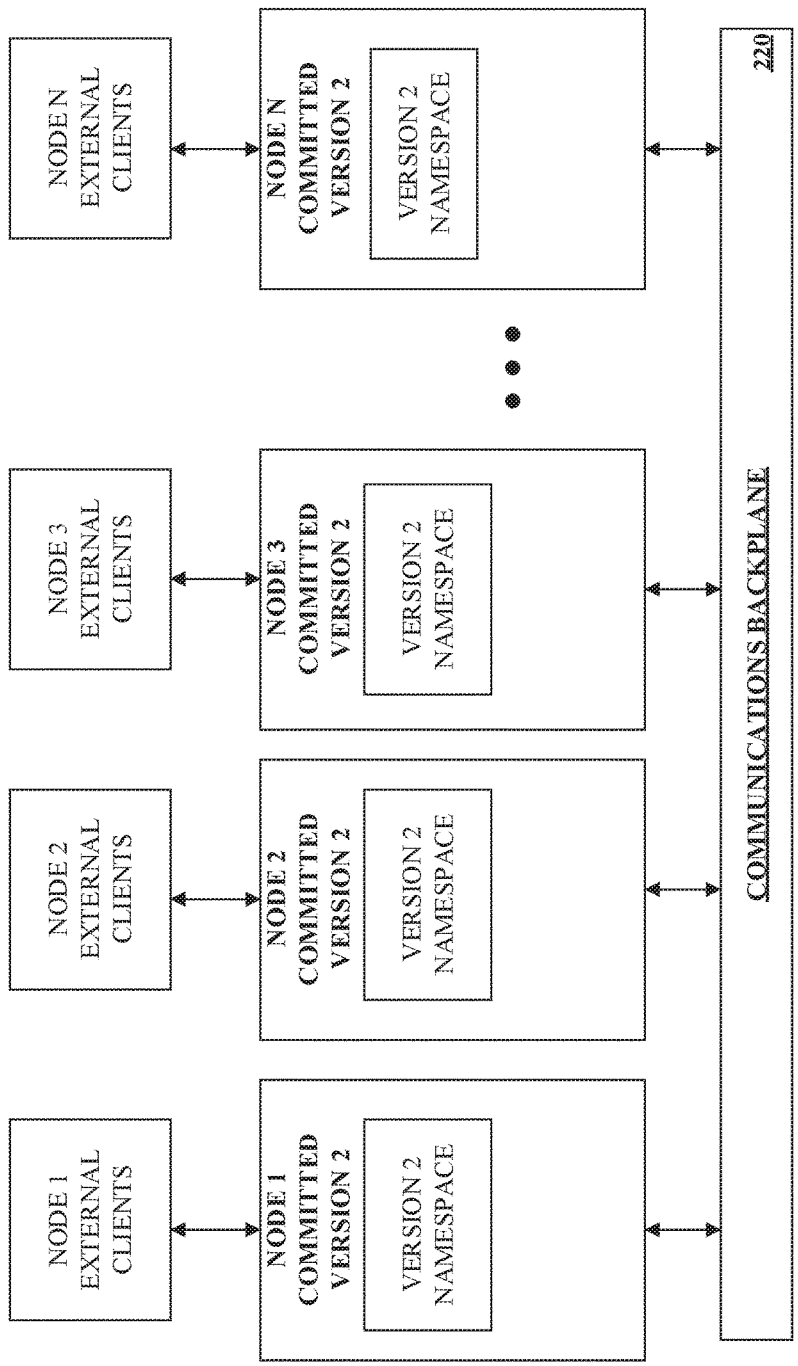
FIG. 5 illustrates an example cluster of nodes in a committed state after an upgrade in accordance with implementations of this disclosure.

Referring now to FIG. 5, there is illustrated an example cluster of nodes in a committed state after an upgrade in accordance with implementations of this disclosure. In this example, the cluster entered the committed state from an upgraded state, and therefore committed to retaining the namespace associated with the upgraded version (e.g., Version 2). The namespace associated with Version 1 that was being maintained in parallel during the upgrade process can be expired. In an example not depicted, the cluster could enter the committed state from a downgrading state, and the namespace associated with Version 1 could be retained while the namespace associated with Version 2 could be expired. It can be appreciated that until the cluster enters a committed state, both versions of the namespace can be maintained.

Figure 6:
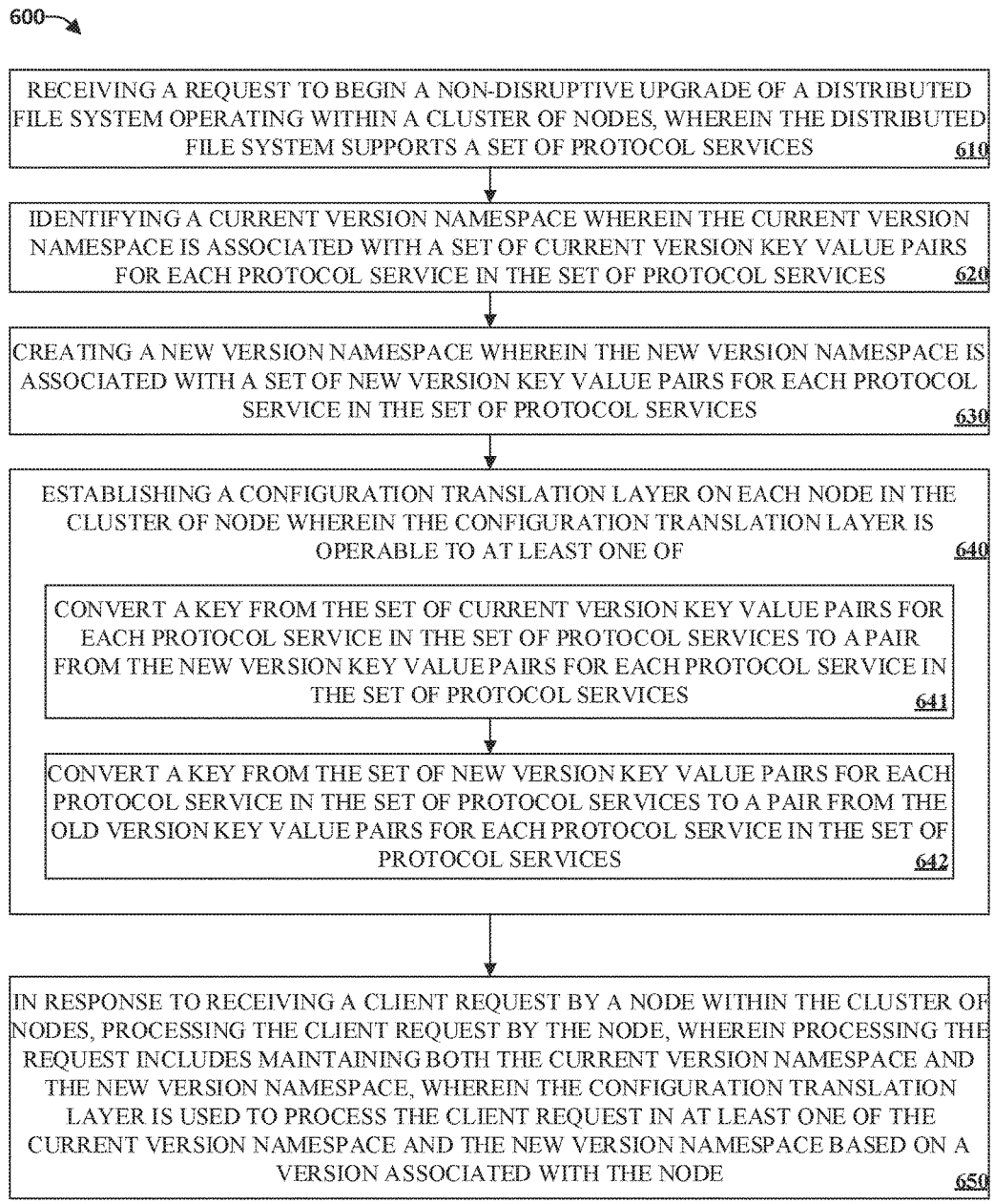
FIG. 6 illustrates an example method for initiating a non-disruptive upgrade process including creating a second namespace and establishing a configuration translation layer in accordance with implementations of this disclosure.
Figure 7:
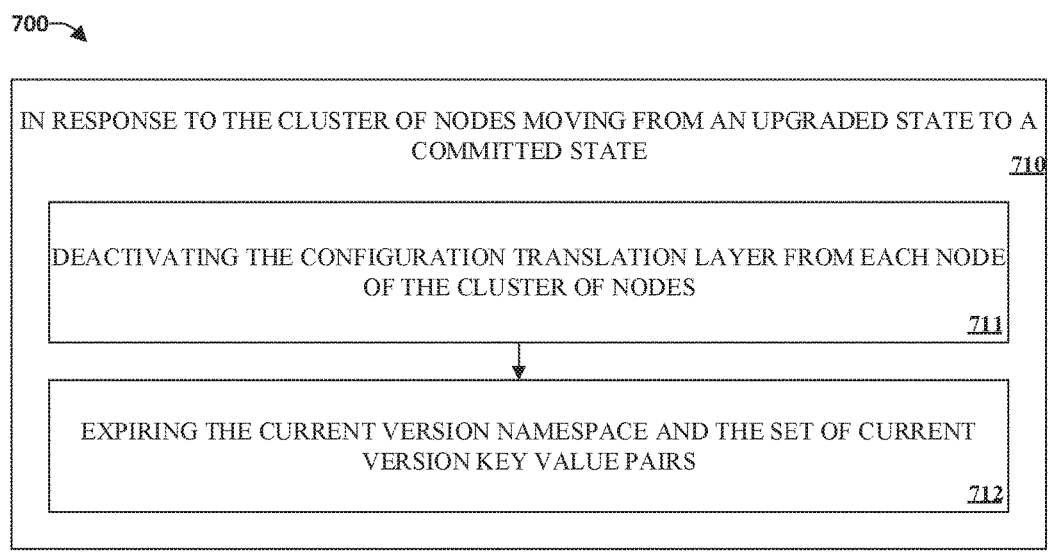
FIG. 7 illustrates an example method for moving from an upgraded state to a committed state in accordance with implementations of this disclosure.
Figure 8:
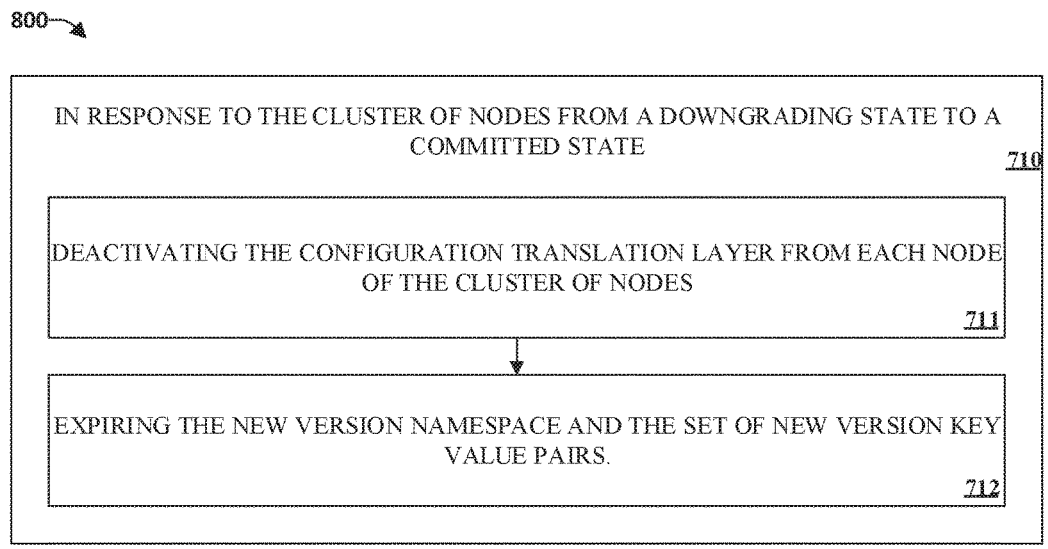
FIG. 8 illustrates an example method for moving from a downgrading state to a committed state in accordance with implementations of this disclosure.

FIGS. 6-8 illustrate methods and/or flow diagrams in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 6 illustrates an example method for initiating a non-disruptive upgrade process including creating a second namespace and establishing a configuration translation layer in accordance with implementations of this disclosure.

At 610, a request can be received to begin a non-disruptive upgrade of a distributed file system operating within a cluster of nodes, wherein the distributed file system supports a set of protocol services.

At 620, a current version namespace can be identified wherein the current version namespace is associated with a set of current version key value pairs for each protocol service in the set of protocol services.

At 630, a new version namespace can be created wherein the new version namespace is associated with a set of new version key value pairs for each protocol service in the set of protocol services.

In one implementation, a key value pair interface can be established wherein the key value pair interface provides for a user of the distributed file system to at least one of create key value pairs, update key value pairs, remove key value pairs, and restore a namespace.

In one implementation, the set of current version key value pairs and the set of new version key value pairs include at least one of create keys, update keys, get keys, and remove keys.

At 640, a configuration translation layer can be established on each node in the cluster of node wherein the configuration translation layer is operable to at least one of take the actions as described in steps 641 and 642 below.

At 641, a key can be converted from the set of current version key value pairs for each protocol service in the set of protocol services to a pair from the new version key value pairs for each protocol service in the set of protocol services.

At 642, a key can be converted from the set of new version key value pairs for each protocol service in the set of protocol services to a pair from the old version key value pairs for each protocol service in the set of protocol services.

At 650, in response to receiving a client request by a node within the cluster of nodes, the client request can be processed by the node, wherein processing the request includes maintaining both the current version namespace and the new version namespace, wherein the configuration translation layer is used to process the client request in at least one of the current version namespace and the new version namespace based on a version associated with the node.

FIG. 7 illustrates an example method for moving from an upgraded state to a committed state in accordance with implementations of this disclosure. At 710, in response to the cluster of nodes moving from an upgraded state to a committed state, actions 711 and 712 as described below can be processed. At 711, the configuration translation layer from each node of the cluster of nodes can be deactivated. At 712, the current version namespace and the set of current version key value pairs can be expired.

FIG. 8 illustrates an example method for moving from a downgrading state to a committed state in accordance with implementations of this disclosure. At 810, in response to the cluster of nodes moving from a downgrading state to a committed state, actions 811 and 812 as described below can be processed. At 811, the configuration translation layer from each node of the cluster of nodes can be deactivated. At 812, the new version namespace and the set of new version key value pairs can be expired.

Figure 9:
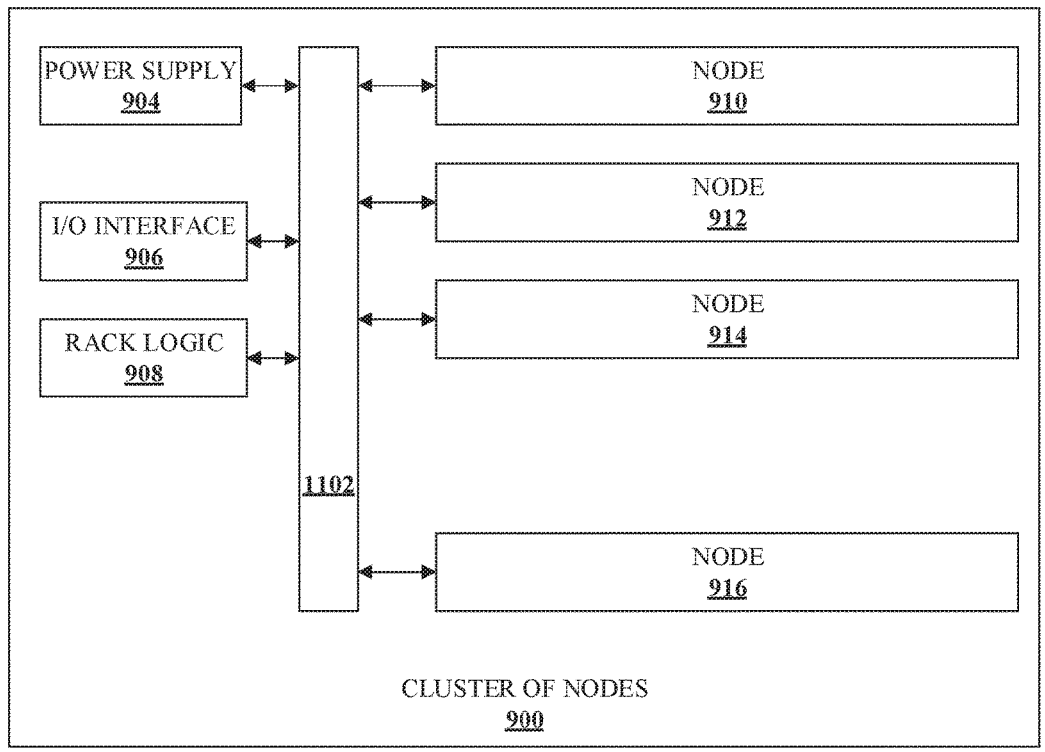
FIG. 9 illustrates an example block diagram of rack of a cluster of nodes in accordance with implementations of this disclosure.

FIG. 9 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 910, 912, 914 and 916 operating in a cluster; however, it can be appreciated that more or less nodes can make up a cluster. It can be further appreciated that nodes among the cluster of nodes do not have to be in a same enclosure as shown for ease of explanation in FIG. 9, and can be geographically disparate. Backplane 902 can be any type of commercially available networking infrastructure that allows nodes among the cluster of nodes to communicate amongst each other in as close to real time as the networking infrastructure allows. It can be appreciated that the backplane 902 can also have a separate power supply, logic, I/O, etc. as necessary to support communication amongst nodes of the cluster of nodes.

As shown in the figure, enclosure 900 contains at least a power supply 904, an input/output interface 906, rack logic 908, several blade servers 910, 912, 914, and 916, and backplane 902. Power supply 904 provides power to each component and blade server within the enclosure. The input/output interface 906 provides internal and external communication for components and blade servers within the enclosure. Backplane 908 can enable passive and active communication of power, logic, input signals, and output signals for each blade server.

It can be appreciated that the Cluster of nodes 900 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 46 disk drive bays with attached disk storage in each bay. It can be appreciated that nodes within the cluster of nodes can have varying configurations and need not be uniform.

Figure 10:
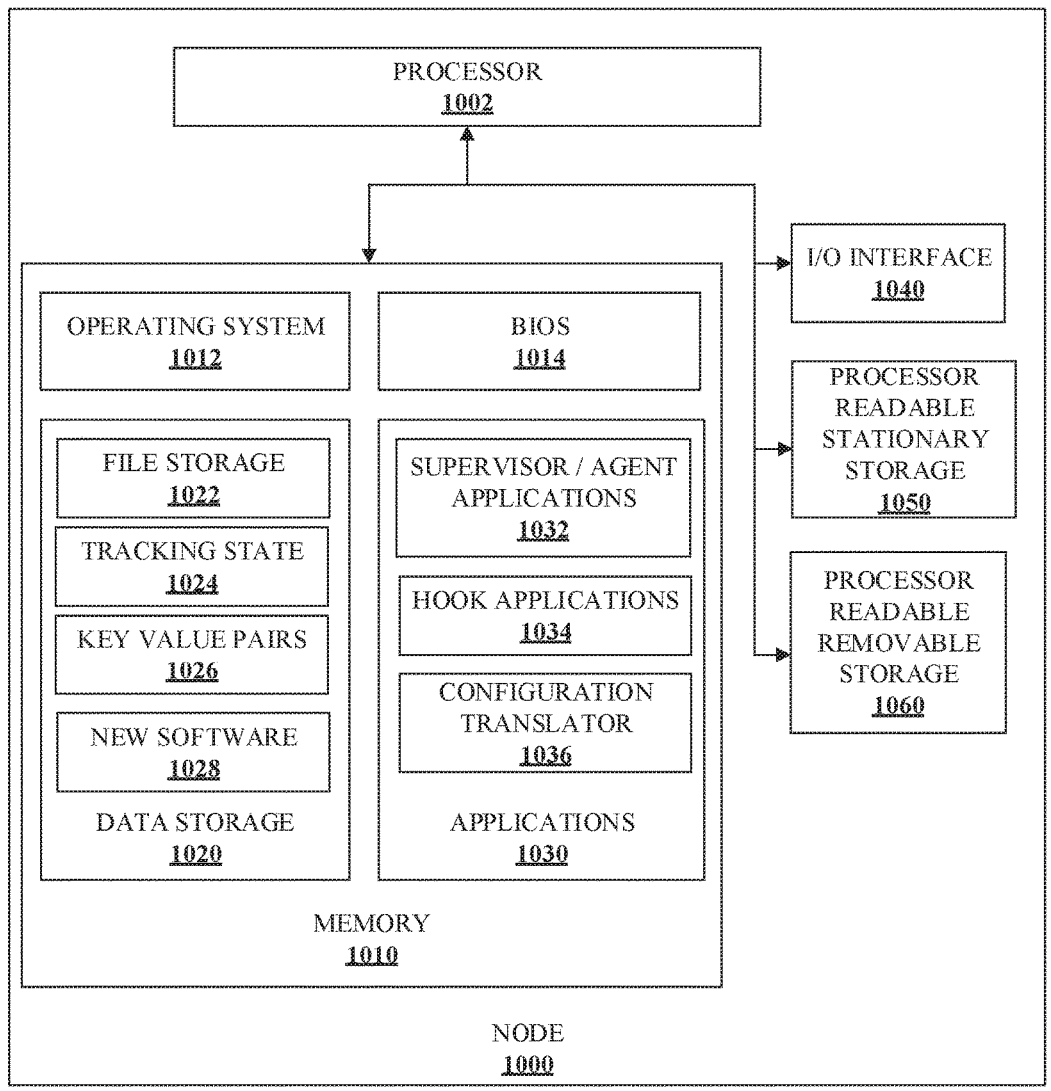
FIG. 10 illustrates an example block diagram of a node in accordance with implementations of this disclosure.

FIG. 10 illustrates an example block diagram of a blade server 1000 in accordance with implementations of this disclosure. As shown in FIG. 10, a plurality of blade servers may be included in one enclosure that shares resources provided by the enclosure to reduce size, power, and cost.

Node 1000 includes processor 1002 which communicates with memory 1010 via a bus. Node 1000 also includes input/output interface 1040, processor-readable stationary storage device(s) 1050, and processor-readable removable storage device(s) 1060. Input/output interface 1040 can enable node 1000 to communicate with other nodes, mobile devices, network devices, and the like. Processor-readable stationary storage device 1050 may include one or more devices such as an electromagnetic storage device (hard disk), solid state hard disk (SSD), hybrid of both an SSD and a hard disk, and the like. In some configurations, a node may include many storage devices. Also, processor-readable removable storage device 1060 enables processor 1002 to read non-transitive storage media for storing and accessing processor-readable instructions, modules, data structures, and other forms of data. The non-transitive storage media may include Flash drives, tape media, floppy media, disc media, and the like.

Memory 1010 may include Random Access Memory (RAM), Read-Only Memory (ROM), hybrid of RAM and ROM, and the like. As shown, memory 1010 includes operating system 1012 and basic input/output system (BIOS) 1014 for enabling the operation of blade server 1000. In various embodiments, a general-purpose operating system may be employed such as a version of UNIX, LINUX™, FreeBSD, OneFS, a specialized server operating system such as Microsoft's Windows Server™ and Apple Computer's OS X, or the like.

Applications 1030 may include processor executable instructions which, when executed by node 1000, transmit, receive, and/or otherwise process messages, audio, video, and enable communication with other networked computing devices. Examples of application programs include database servers, file servers, calendars, transcoders, and so forth. Applications 1030 may include, for example, supervisor and agent applications 1032 and event hook applications 1034 according to implementations of this disclosure. The configuration translator 1036 (e.g., the configuration translation layer) can be stored as an application. It can be appreciated that a UI for such applications can exists, such as within a web UI for the distributed file system as a whole.

Human interface components (not pictured), may be remotely associated with blade server 1000, which can enable remote input to and/or output from blade server 1000. For example, information to a display or from a keyboard can be routed through the input/output interface 1040 to appropriate peripheral human interface components that are remotely located. Examples of peripheral human interface components include, but are not limited to, an audio interface, a display, keypad, pointing device, touch interface, and the like.

Data storage 1020 may reside within memory 1010 as well, storing file storage 1022 data such as metadata or LIN data. It can be appreciated that LIN data and/or metadata can relate to file storage within processor readable stationary storage 1050 and/or processor readable removable storage 1060. For example, LIN data may be cached in cache memory 1024 for faster or more efficient frequent access versus being stored within processor readable stationary storage 1050. In addition, Data storage 1020 can also store the tracking state 1024 of a node for reference by the supervisor and/or agent applications 132. Key value pairs 1026 can be stored within data storage. New software 1028 such as the image for the new version of the distributed file system as well as old version of the distributed file system that supports a node being rolledback. In addition, the separately maintained namespaces can both be stored within data storage 1020 and/or distributed across the data storage of each node or a subset of nodes in the cluster of nodes.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    receiving a request to begin a non-disruptive upgrade of a distributed file system operating within a cluster of nodes, wherein the distributed file system supports a set of protocol services;
    identifying a current version namespace, wherein the current version namespace is associated with a set of current version key value pairs for each protocol service in the set of protocol services;
    creating a new version namespace, wherein the new version namespace is associated with a set of new version key value pairs for each protocol service in the set of protocol services;
    establishing a configuration translation layer on each node within the cluster of nodes, wherein the configuration translation layer is operable to at least one of:
        convert a key from the set of current version key value pairs for each protocol service in the set of protocol services to a new version key value pair from the set of new version key value pairs for each protocol service in the set of protocol services; and
        convert a key from the set of new version key value pairs for each protocol service in the set of protocol services to an old version key value pair from a set of old version key value pairs for each protocol service in the set of protocol services; and
    in response to receiving a client request by a node within the cluster of nodes, processing the client request by the node within the cluster of nodes, wherein processing the client request includes maintaining both the current version namespace and the new version namespace, and wherein the configuration translation layer is used to process the client request in at least one of the current version namespace and the new version namespace based on a version associated with the node within the cluster of nodes.

2. The method of claim 1, further comprising:
    in response to the cluster of nodes moving from an upgraded state to a committed state:
        deactivating the configuration translation layer from each node within the cluster of nodes; and
        expiring the current version namespace and the set of current version key value pairs for each protocol service in the set of protocol services.

3. The method of claim 1, further comprising:
    in response to the cluster of nodes moving from a downgraded state to a committed state:
        deactivating the configuration translation layer from each node within the cluster of nodes; and
        expiring the new version namespace and the set of new version key value pairs for each protocol service in the set of protocol services.

4. The method of claim 1, further comprising:
    establishing a key value pair interface, wherein the key value pair interface provides for a user of the distributed file system to at least one of create key value pairs, update key value pairs, remove key value pairs, and restore a namespace.

5. The method of claim 1, wherein the set of current version key value pairs and the set of new version key value pairs include at least one of create keys, update keys, get keys, and remove keys.

6. A system comprising at least one storage device and at least one hardware processor configured to:
    receive a request to begin a non-disruptive upgrade of a distributed file system operating within a cluster of nodes, wherein the distributed file system supports a set of protocol services;
    identify a current version namespace, wherein the current version namespace is associated with a set of current version key value pairs for each protocol service in the set of protocol services;
    create a new version namespace, wherein the new version namespace is associated with a set of new version key value pairs for each protocol service in the set of protocol services;

establish a configuration translation layer on each node within the cluster of nodes, wherein the configuration translation layer is operable to at least one of:
- convert a key from the set of current version key value pairs for each protocol service in the set of protocol services to a new version key value pair from the set of new version key value pairs for each protocol service in the set of protocol services; and
- convert a key from the set of new version key value pairs for each protocol service in the set of protocol services to an old version key value pair from a set of old version key value pairs for each protocol service in the set of protocol services; and in response to receiving a client request by a node within the cluster of nodes, process the client request by the node within the cluster of nodes, wherein processing the client request includes maintaining both the current version namespace and the new version namespace, and wherein the configuration translation layer is used to process the client request in at least one of the current version namespace and the new version namespace based on a version associated with the node within the cluster of nodes.

7. The system of claim 6, wherein the at least one hardware processor is further configured to:
in response to the cluster of nodes moving from an upgraded state to a committed state:
- deactivate the configuration translation layer from each node within the cluster of nodes; and
- expire the current version namespace and the set of current version key value pairs for each protocol service in the set of protocol services.

8. The system of claim 6, wherein the at least one hardware processor is further configured to:
in response to the cluster of nodes moving from a downgraded state to a committed state:
- deactivate the configuration translation layer from each node within the cluster of nodes; and
- expire the new version namespace and the set of new version key value pairs for each protocol service in the set of protocol services.

9. The system of claim 6, wherein the at least one hardware processor is further configured to:
establish a key value pair interface, wherein the key value pair interface provides for a user of the distributed file system to at least one of create key value pairs, update key value pairs, remove key value pairs, and restore a namespace.

10. The system of claim 6, wherein the set of current version key value pairs and the set of new version key value pairs include at least one of create keys, update keys, get keys, and remove keys.

11. A non-transitory computer readable medium with program instructions stored thereon to perform the following steps:
receiving a request to begin a non-disruptive upgrade of a distributed file system operating within a cluster of nodes, wherein the distributed file system supports a set of protocol services;
identifying a current version namespace, wherein the current version namespace is associated with a set of current version key value pairs for each protocol service in the set of protocol services;
creating a new version namespace, wherein the new version namespace is associated with a set of new version key value pairs for each protocol service in the set of protocol services;
establishing a configuration translation layer on each node within the cluster of nodes, wherein the configuration translation layer is operable to at least one of:
- convert a key from the set of current version key value pairs for each protocol service in the set of protocol services to a new version key value pair from the set of new version key value pairs for each protocol service in the set of protocol services; and
- convert a key from the set of new version key value pairs for each protocol service in the set of protocol services to an old version key value pair from a set of old version key value pairs for each protocol service in the set of protocol services; and in response to receiving a client request by a node within the cluster of nodes, processing the client request by the node within the cluster of nodes, wherein processing the client request includes maintaining both the current version namespace and the new version namespace, and wherein the configuration translation layer is used to process the client request in at least one of the current version namespace and the new version namespace based on a version associated with the node within the cluster of nodes.

12. The non-transitory computer readable medium of claim 11, with program instructions stored thereon to further perform the following steps:
in response to the cluster of nodes moving from an upgraded state to a committed state:
- deactivating the configuration translation layer from each node within the cluster of nodes; and
- expiring the current version namespace and the set of current version key value pairs for each protocol service in the set of protocol services.

13. The non-transitory computer readable medium of claim 11, with program instructions stored thereon to further perform the following steps:
in response to the cluster of nodes moving from a downgraded state to a committed state:
- deactivating the configuration translation layer from each node within the cluster of nodes; and
- expiring the new version namespace and the set of new version key value pairs for each protocol service in the set of protocol services.

14. The non-transitory computer readable medium of claim 11, with program instructions stored thereon to further perform the following step:
establishing a key value pair interface, wherein the key value pair interface provides for a user of the distributed file system to at least one of create key value pairs, update key value pairs, remove key value pairs, and restore a namespace.

15. The non-transitory computer readable medium of claim 11, wherein the set of current version key value pairs and the set of new version key value pairs include at least one of create keys, update keys, get keys, and remove keys.

* * * * *